United States Patent [19]

Graham

[11] 4,063,605
[45] Dec. 20, 1977

[54] FLUID POWER TRANSMISSION SYSTEM

[75] Inventor: MacKellar K. Graham, Birmingham, Mich.

[73] Assignee: Sperry Rand Corporation, Troy, Mich.

[21] Appl. No.: 731,261

[22] Filed: Oct. 12, 1976

[51] Int. Cl.² .................. G01G 3/00; G01G 21/28
[52] U.S. Cl. ...................... 177/225; 73/296; 177/245
[58] Field of Search .............. 73/296; 177/245, 225, 177/173, 168, 229; 116/114 S; 138/30

[56] References Cited

U.S. PATENT DOCUMENTS

| 8,088 | 5/1851 | Faber | 73/296 |
|---|---|---|---|
| 2,575,110 | 11/1951 | Kerr | 73/296 X |
| 2,594,833 | 4/1952 | White | 138/30 X |
| 2,670,194 | 2/1954 | Hansson | 116/114 S |
| 3,174,658 | 3/1965 | Wittenberg et al. | 138/30 X |
| 3,353,615 | 11/1967 | Nebimken | 177/245 |

FOREIGN PATENT DOCUMENTS

| 670,571 | 3/1934 | Germany | 73/296 |
|---|---|---|---|
| 463,057 | 4/1951 | Italy | 73/296 |

Primary Examiner—Daniel M. Yasich
Attorney, Agent, or Firm—Theodore Van Meter

[57] ABSTRACT

A fluid reservoir for hydraulic power systems comprises a tank divided into a liquid compartment and an air compartment by a flexible diaphragm so that the liquid will be pressurized by compressed air in the air compartment. The tank is supported in a stationary frame upon horizontal pivots and a balancing spring. The liquid inlet and outlet connections pass through the pivots. An indicator is provided for showing the vertical position of the tank relative to the frame on the balancing spring and thus indicating the amount of liquid in the tank.

1 Claim, 2 Drawing Figures

FLUID POWER TRANSMISSION SYSTEM

In many hydraulic power systems, the pump intake is supplied from a reservoir to which fluid returns after passing through the work-performing parts of the system. Problems frequently arise with premature pump wear caused by cavitation in the inlet passages of the pump. One method of alleviating this problem is to provide a pressurized reservoir serving to increase the pressure in the pump intake passages sufficiently to avoid the formation of subatmospheric pockets within the pump inlet passages.

The present invention aims to provide a reservoir of this type with improved structural features as well as one which provides additional convenience functions.

The invention consists in a reservoir for hydraulic fluid power systems comprising a rigid container having an open mouth, a diaphragm of impermeable flexible sheet material dividing the container into a liquid compartment and a gas compartment, a cover closing the mouth, a frame supporting the container for movement relative thereto, spring means balancing the container and the contents at various positions according to the weight thereof, means for indicating such positions, a liquid delivery conduit and a liquid return conduit, motion accommodating connections between the conduits and the frame, a gas connection to the gas compartment, and barrier means preventing expansion of the diaphragm beyond a predetermined gas compartment volume significantly smaller than the total container volume.

IN THE DRAWINGS

Figure 1:
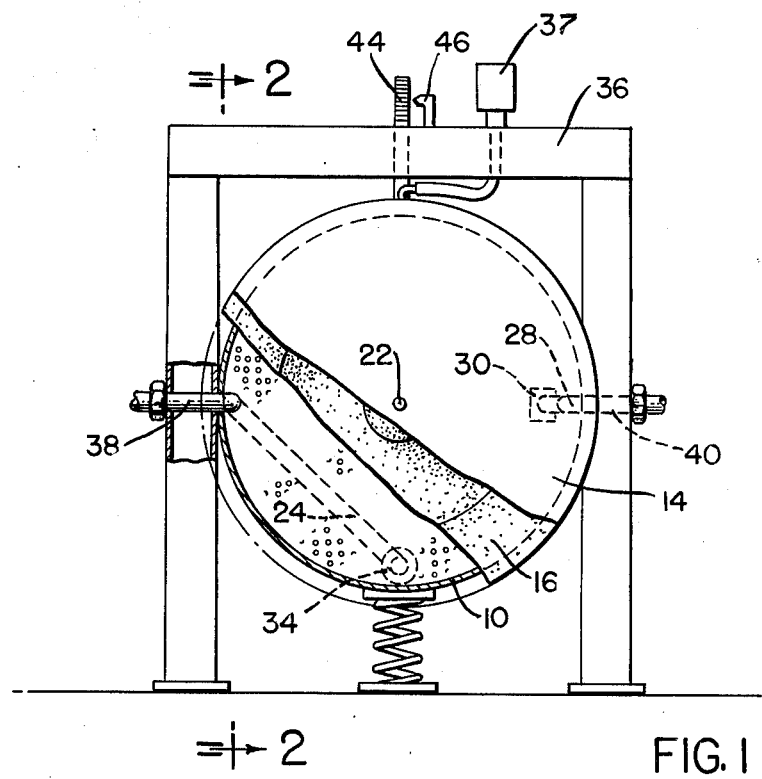
FIG. 1 is an end view of a hydraulic reservoir embodying a preferred form of the present invention.
Figure 2:
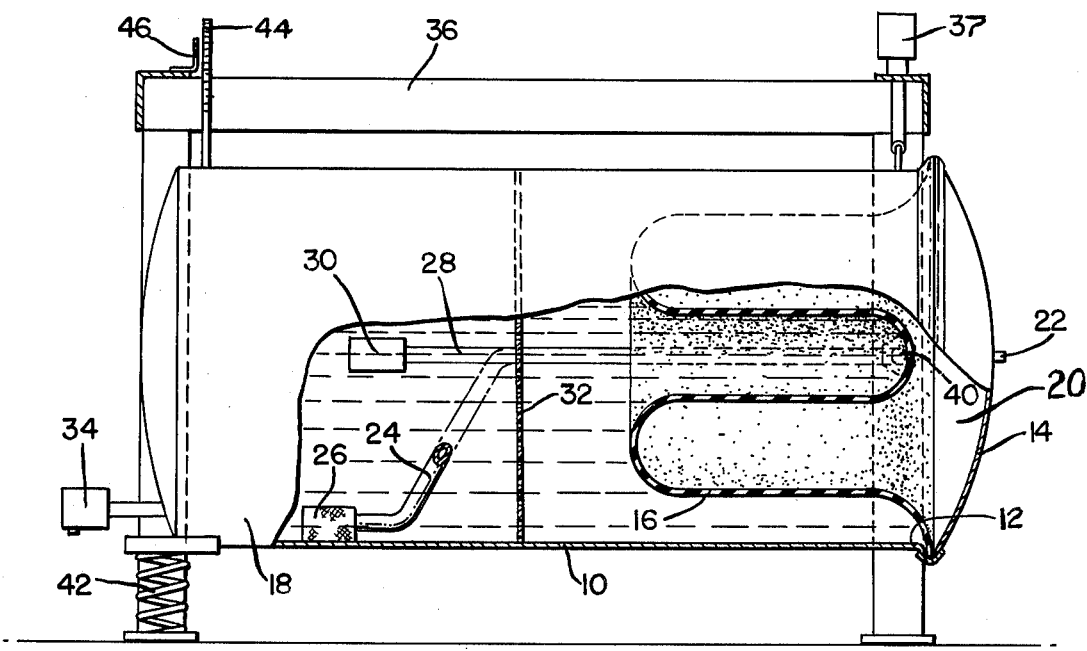
FIG. 2 is a side view of the reservoir taken partially in section along line 2—2 of FIG. 1.

The reservoir proper in its preferred form comprises a cylindrical tank 10 having an open ended mouth 12 which is closed by a cover 14. A flexible diaphragm 16 is sealed between the tank and the cover to provide a large liquid compartment 18 and a smaller air compartment 20. A connection 22 allows for charging and gauging pressure in the compartment 20. A liquid deliery conduit 24 having a strainer 26 is provided inside the liquid compartment 18 and a liquid return conduit 28 having a diffuser 30 is also provided therein. A baffle or perforated partition 32 is provided approximately midway along the length of the reservoir to prohibit expansion of the diaphragm toward the left beyond a predetermined amount. A low pressure liquid relief valve 34 may be provided at the left end and an air bleed valve 37 is provided near the top of the right end ot the reservoir.

In the operation of hydraulic power systems, a certain amount of leakage of the fluid from the system is almost unavoidable which is cumulative and ultimately reduces the quantity in the reservoir to an unacceptable amount. Also, there are occasional large leaks having the same effect. With a sealed and pressurized reservoir, it is impossible to know the amount of liquid in the reservoir, except by the provision of a sight glass since a float operated indicator cannot be used. Sight glasses leave much to be desired in the way of durability, accessibility and cost.

In the present invention, means is provided for continually weighing the reservoir and thus indicating the quantity of liquid therein. For this purpose, a frame 36 is provided to support the reservoir on pivots 38 and 40 which include motion accommodating fluid connections. A balancing spring 42 supports the left end of the reservoir and an indicator rod 44 moves between a range of positions adjacent an index marker 46 to indicate the quantity of liquid in the liquid compartment 18. The liquid outlet conduit 24 passes through the pivot 38 by a hydraulic swivel joint and the liquid return conduit 28 passes through the pivot 40 by a similar swivel joint.

In operation, the air compartment 20 is first filled through the connection 22 causing the diaphragm 16 to expand until a small fraction, say one eighth, of the desired final degree of superatmospheric pressure is achieved. During this phase, the baffle 32 will prevent overexpansion of the diaphragm 16. Thereafter, the liquid compartment 18 is filled by pumping fluid into the liquid return conduit 28 while the air bleed valve is maintained open. As soon as liquid appears at the air bleed valve, the valve is closed. Pumping is continued until the desired degree of pressure is reached. The reservoir is then ready for operation. The spring 42 is preferably calibrated to hold the container 10 at its mid position when filled in this manner.

I claim:

1. A reservoir for hydraulic fluid power systems comprising a rigid container having an open mouth, a diaphragm of impermeable flexible sheet material closing the mouth of the container and dividing the container into a liquid compartment and a gas compartment, a cover having a gas inlet closing the mouth and diaphragm, a frame supporting the container on pivots for movement relative thereto, calibrated spring means connected between one end of the container and the frame for balancing the container and contents at various positions according to the weight thereof, means connected between the container and the frame for indicating such positions, a liquid delivery conduit passing through one of the pivots and secured to the frame and a liquid return conduit passing through the other of the pivots and secured to the frame, means passing through the pivots and connected between each conduit and the container for accommodating relative motion between the container and the frame, a gas connection to the gas compartment, and barrier means preventing expansion of the diaphragm by gas applied through said gas inlet beyond a predetermined gas compartment volume significantly smaller than the total container volume.

* * * * *